(12) United States Patent
Suzuki et al.

(10) Patent No.: US 7,848,255 B2
(45) Date of Patent: Dec. 7, 2010

(54) CONTROLLER APPARATUS, MOBILE TERMINAL, AND COMMUNICATION CONTROL METHOD FOR CHANGING TOPOLOGY

(75) Inventors: Toshihiro Suzuki, Yokohama (JP); Motonari Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 644 days.

(21) Appl. No.: 11/312,580

(22) Filed: Dec. 21, 2005

(65) Prior Publication Data

US 2006/0159033 A1 Jul. 20, 2006

(30) Foreign Application Priority Data

Dec. 21, 2004 (JP) ............................ P2004-370216

(51) Int. Cl.
*H04L 12/28* (2006.01)
*H04Q 7/00* (2006.01)
(52) U.S. Cl. .................... 370/254; 370/328; 370/401
(58) Field of Classification Search ............... 370/254, 370/255, 328, 338, 351, 400, 401
See application file for complete search history.

(56) References Cited

U.S. PATENT DOCUMENTS

| | | | | |
|---|---|---|---|---|
| 5,987,011 | A * | 11/1999 | Toh | 370/331 |
| 6,535,498 | B1 * | 3/2003 | Larsson et al. | 370/338 |
| 6,980,524 | B1 * | 12/2005 | Lu et al. | 370/254 |
| 7,382,765 | B2 * | 6/2008 | Kennedy et al. | 370/351 |
| 2003/0220842 | A1 * | 11/2003 | Watanabe et al. | 705/26 |
| 2003/0235174 | A1 * | 12/2003 | Pichna et al. | 370/338 |
| 2004/0127214 | A1 * | 7/2004 | Reddy et al. | 455/426.2 |
| 2004/0218548 | A1 * | 11/2004 | Kennedy et al. | 370/254 |
| 2004/0233855 | A1 * | 11/2004 | Gutierrez et al. | 370/252 |
| 2004/0240457 | A1 | 12/2004 | Habetha et al. | |
| 2005/0041628 | A1 * | 2/2005 | Duggi et al. | 370/338 |
| 2005/0070302 | A1 * | 3/2005 | Raghavachari | 455/456.1 |

FOREIGN PATENT DOCUMENTS

| | | |
|---|---|---|
| CN | 1555635 A | 12/2004 |
| JP | 11-252627 | 9/1999 |
| JP | 2004-135151 | 4/2004 |
| JP | 2004-165964 | 6/2004 |
| WO | WO 2004/080002 A1 | 9/2004 |

OTHER PUBLICATIONS

T. Clausen, et al., "Optimized Link State Routing Protocol (OLSR)", Project Hipercom, INRIA, Network Working Group, Request for Comments: 3626, Oct. 2003, pp. 1 - 75.

* cited by examiner

*Primary Examiner*—Hong Cho
(74) *Attorney, Agent, or Firm*—Oblon, Spivak, McClelland, Maier & Neustadt, L.L.P.

(57) ABSTRACT

A controller apparatus of this invention includes a topology information managing unit configured to manage topology information showing a topology, a location information acquiring unit configured to acquire location information on a plurality of mobile terminals, a link information acquiring unit configured to acquire link information at the mobile terminals, a determining unit configured to determine a way to change the topology, based on the location information, the link information and the topology information, and a transmitting unit configured to generate instruction information for changing the topology, based on the determined way to change the topology, and to transmit the instruction information to a certain mobile terminal.

11 Claims, 9 Drawing Sheets

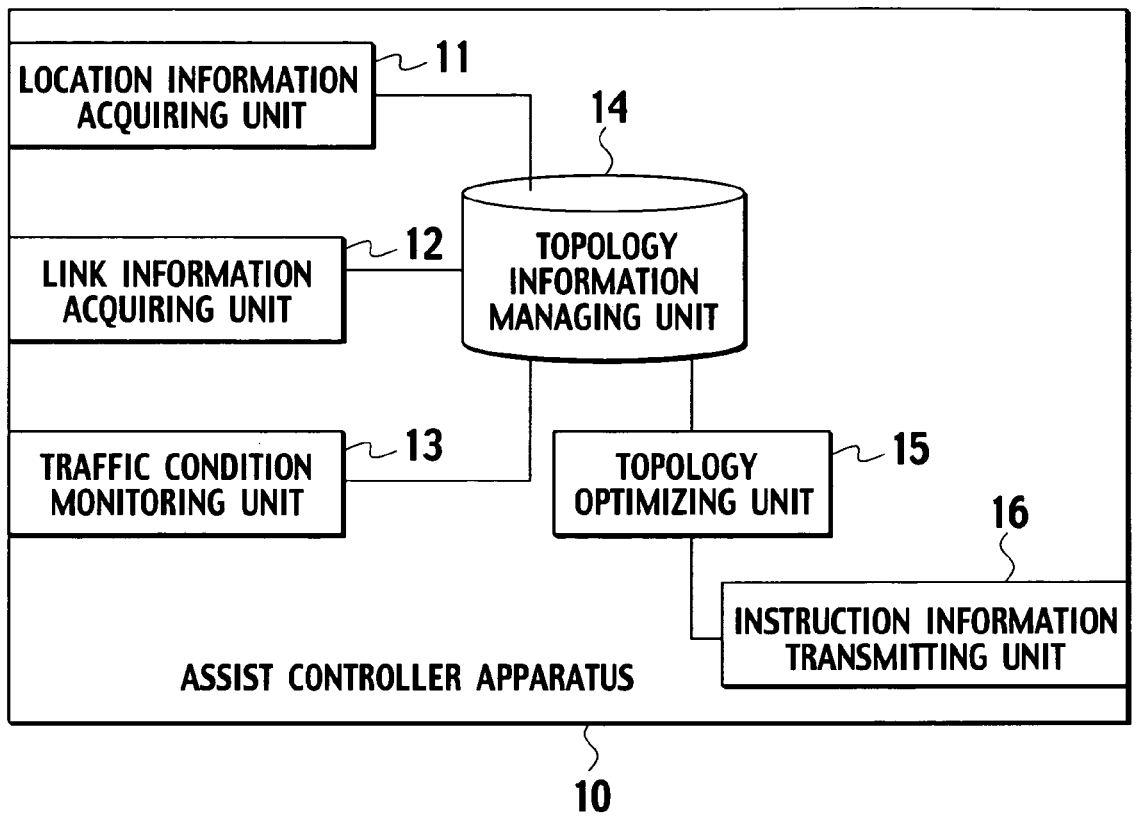

CONTROLLER APPARATUS, MOBILE TERMINAL, AND COMMUNICATION CONTROL METHOD FOR CHANGING TOPOLOGY

CROSS REFERENCE TO RELATED APPLICATION

This application is based upon and claims the benefit of priority from the prior Japanese Patent Application No. P2004-370216, filed on Dec. 21, 2004; the entire contents of which are incorporated herein by reference.

BACKGROUND OF THE INVENTION

1. Field of the Invention

The present invention relates to a communication control method in which a controller apparatus is configured to control a topology in an ad hoc network formed by a plurality of mobile terminals, and a controller apparatus and a mobile terminal used in the communication control method.

2. Description of the Related Art

An ad hoc network formed by the configuration of a number of mobile terminals connected to each other without access points therebetween, using a wireless technology such as IEEE 802.11x or Bluetooth (registered trademark), has been known.

In such an ad hoc network, a route used in communication between mobile terminals is established through a plurality of relay mobile terminals. That is, communication between mobile terminals forming such an ad hoc network is performed through a plurality of relay mobile terminals, or multi-hop.

A conventional ad hoc network, however, has the problem that, when a small amount of movement of a relay mobile terminal located on a route used for communication between mobile terminals greatly reduces the hop count in the communication between the mobile terminals, or when joining of a certain mobile terminal in the ad hoc network to be a relay mobile terminal in the route greatly reduces the hop count in the communication between the mobile terminals, the route cannot be flexibly changed, that is, a topology in the ad hoc network cannot be flexibly changed.

BRIEF SUMMARY OF THE INVENTION

The present invention has been made in view of the above problem, and has an object of providing a communication control method, a controller apparatus and a mobile terminal which allow flexible change of a topology in an ad hoc network based on physical locations of mobile terminals in the ad hoc network.

A first aspect of the present invention is summarized as a controller apparatus configured to control a topology in an ad hoc network formed by a plurality of mobile terminals, the controller apparatus including: a topology information managing unit configured to manage topology information showing the topology; a location information acquiring unit configured to acquire location information on the mobile terminals; a link information acquiring unit configured to acquire link information at the mobile terminals; a determining unit configured to determine a way to change the topology, based on the acquired location information, the acquired link information, and the topology information managed by the topology information managing unit; and a transmitting unit configured to generate instruction information for changing the topology, based on the determined way to change the topology, for transmission to a certain mobile terminal.

In the first aspect of the present invention, the instruction information can be configured to instruct the certain mobile terminal forming a part of the ad hoc network to move in a required direction or to a required location.

In the first aspect of the present invention, the instruction information can be configured to instruct the certain mobile terminal not joining in the ad hoc network to join in the ad hoc network.

In the first aspect of the present invention, the determining unit can be configured to determine a way to change the topology, based on traffic conditions in the ad hoc network.

In the first aspect of the present invention, the determining unit can be configured to determine a way to change the topology, so as to reduce a hop count in communication between certain mobile terminals.

In the first aspect of the present invention, the controller apparatus can further include: a communication environment information acquiring unit configured to acquire, from the mobile terminals, communication environment information showing a communication environment at the mobile terminals; and a proxy control information transmitting unit configured to transmit proxy control information for performing the topology control in place of the controller apparatus, to a representative mobile terminal belonging to the ad hoc network, when the acquired communication environment information satisfies a predetermined condition.

A second aspect of the present invention is summarized as a mobile terminal configured to be able to join in an ad hoc network, including: a location information transmitting unit configured to transmit location information on the mobile terminal to a controller apparatus configured to control a topology in the ad hoc network; a link information transmitting unit configured to transmit link information at the mobile terminal to the controller apparatus; and an output unit configured to output instruction information transmitted from the controller apparatus.

In the second aspect of the present invention, the instruction information can be configured to instruct the mobile terminal to move in a required direction or to a required location.

In the second aspect of the present invention, the instruction information can be configured to instruct the mobile terminal to join in the ad hoc network.

A third aspect of the present invention is summarized as a communication control method in which a controller apparatus is configured to control a topology in an ad hoc network formed by a plurality of mobile terminals, the method including: acquiring, at the controller apparatus, location information on the mobile terminals; acquiring, at the controller apparatus, link information at the mobile terminals; determining, at the controller apparatus, a way to change the topology, based on the acquired location information, the acquired link information, and topology information showing the topology managed by the controller apparatus; generating, at the controller apparatus, instruction information for changing the topology, based on the determined way to change the topology, for transmission to a certain mobile terminal; and outputting, at the certain mobile terminal, the instruction information transmitted from the controller apparatus.

BRIEF DESCRIPTION OF THE SEVERAL VIEWS OF THE DRAWINGS

FIG. 2 is a functional block diagram of an assist controller apparatus in the mobile communication system according to the first embodiment of the present invention;

FIGS. 3A and 3B are diagrams showing an example of topology information managed by a topology information managing unit of the assist controller apparatus in the mobile communication system according to the first embodiment of the present invention;

DETAILED DESCRIPTION OF THE INVENTION

Configuration of Mobile Communication System in First Embodiment of the Invention With reference to FIGS. 1 to 5, the configuration of a mobile communication system according to a first embodiment of the present invention will be described.

Figure 1:
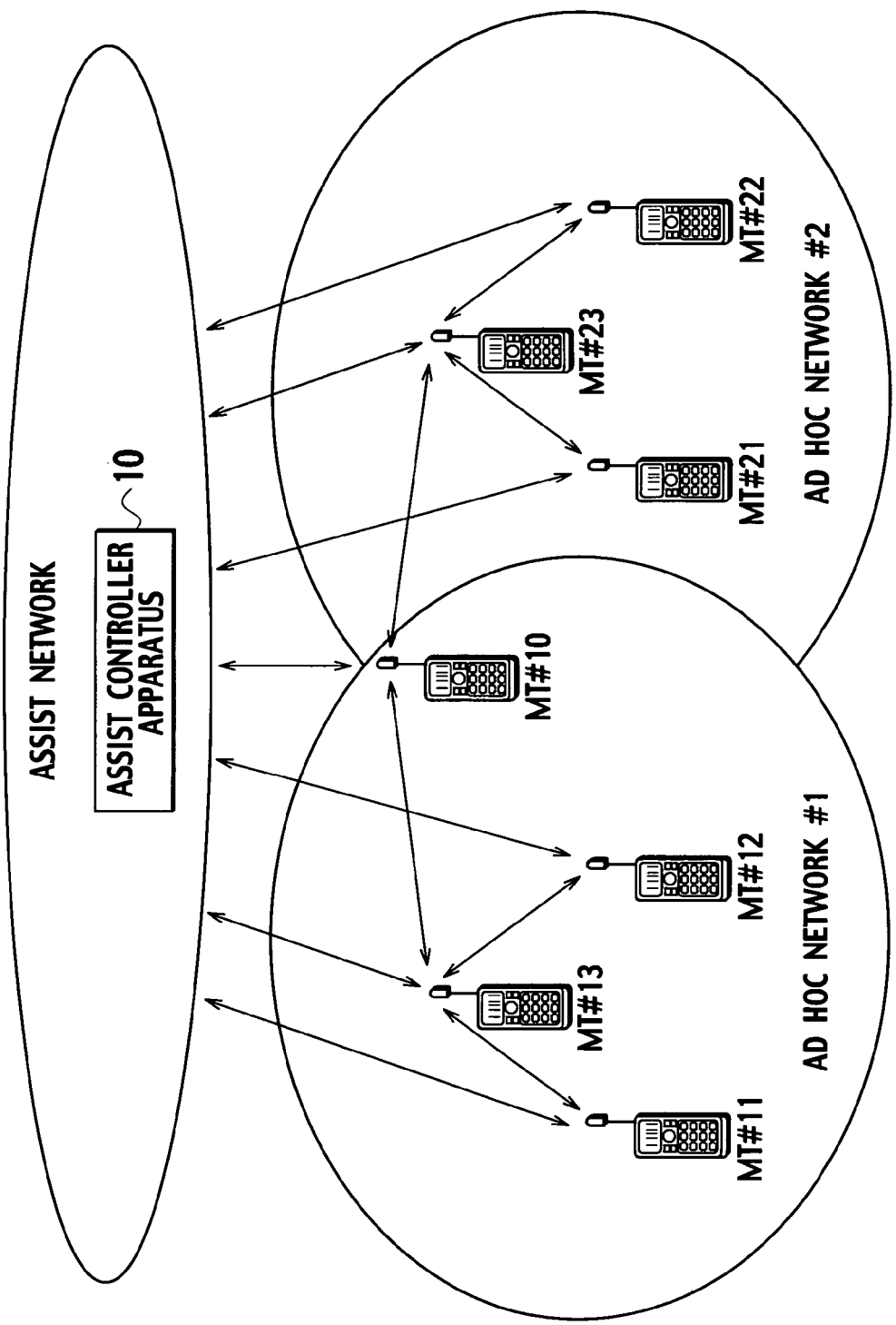
FIG. 1 is an overall configuration diagram of a mobile communication system according to first and second embodiments of the present invention.

As shown in FIG. 1, the mobile communication system of this embodiment includes an assist controller apparatus 10 and a plurality of mobile terminals MT#10 to MT#23.

The assist controller apparatus 10 is provided in an assist network constituted by a public mobile communication network, for example.

The mobile terminals MT#10 to #23 are configured to form ad hoc networks #1 and #2 by directly communicating with each other without using a public mobile communication network.

In the example of FIG. 1, the mobile terminals MT#10 to MT#13 form the ad hoc network #1, and the mobile terminals MT#10 and #21 to #23 form the ad hoc network #2. That is, the mobile terminal MT#10 belongs to both the ad hoc networks #1 and #2.

The assist controller apparatus 10 of this embodiment is configured to control a topology in the ad hoc networks #1 and #2 formed by the mobile terminals MT#10 to #23.

For example, the assist controller apparatus 10 is configured to control the setting state of routes used for communication between the mobile terminals MT.

Specifically, as shown in FIG. 2, the assist controller apparatus 10 of this embodiment includes a location information acquiring unit 11, a link information acquiring unit 12, a traffic condition monitoring unit 13, a topology information managing unit 14, a topology optimizing unit 15, and an instruction information transmitting unit 16.

The location information acquiring unit 11 is configured to acquire location information on the mobile terminals MT#10 to #23.

The location information acquiring unit 11 may be configured to transmit a location information acquisition request to the mobile terminals MT#10 to #23 at predetermined timings, so as to acquire location information on the mobile terminals MT#10 to #23.

The location information acquiring unit 11 may be configured to acquire location information on the mobile terminals MT#10 to #23 transmitted from the mobile terminals MT#10 to #23 at predetermined timings, for example.

The location information can include, for example, location information provided by GPS (GPS information), location information registered with an access point (access point information), or location information registered with a radio base station (base station information).

The link information acquiring unit 12 is configured to acquire link information at the mobile terminals MT#10 to #23.

The link information acquiring unit 12 may be configured to transmit a link information acquisition request to the mobile terminals MT#10 to #23 at predetermined timings, so as to acquire link information at the mobile terminals MT#10 to #23.

The link information acquiring unit 12 may be configured to acquire link information at the mobile terminals MT#10 to #23 transmitted from the mobile terminals MT#10 to #23 at predetermined timings, for example.

The link information can include, for example, a link ID, a mobile terminal ID as the connection destination of the link, and traffic conditions (such as a traffic volume or a congestion state) in the link.

The traffic condition monitoring unit 13 is configured to monitor traffic conditions (such as the traffic volume or the congestion state) at the mobile terminals MT#10 to #23 in the ad hoc networks #1 and #2, and traffic conditions (such as the traffic volume or the congestion state) in the links established between the mobile terminals MT#10 to #23.

The traffic condition monitoring unit 13 may be configured to use link information acquired by the link information acquiring unit 12, so as to monitor traffic conditions (such as the traffic volume or the congestion state) in the links established between the mobile terminals MT#10 to #23, for example.

The topology information managing unit 14 is configured to manage topology information showing a topology in the ad hoc networks #1 and #2.

As shown in FIG. 3A, for example, the topology information managing unit 14 is configured to associate and store a "mobile terminal ID", "location information", "link ID" and "communication mode".

In the example of FIG. 3A, the mobile terminal MT#10 is in a position shown by (X10, Y10), and has established a "Link#A" in a communication mode "A" and a "Link#B" in a communication mode "B".

Also, as shown in FIG. 3B, the topology information managing unit 14 is configured to associate and store a "monitoring point" and a "traffic volume".

In the example of FIG. 3B, the traffic volume at the monitoring point "Link#A" is "T1", and the traffic volume at the monitoring point "MT#10" is "T2".

The topology optimizing unit 15 is configured to determine a way to change a topology in the ad hoc networks #1 and #2, based on location information on the mobile terminals MT#10 to #23 acquired by the location information acquiring unit 11, link information at the mobile terminals MT#10 to #23 acquired by the link information acquiring unit 12, and topology information managed by the topology information managing unit 14.

Specifically, the topology optimizing unit 15 is configured to calculate an optimum topology in the ad hoc networks #1 and #2, based on the current topology in the ad hoc networks #1 and #2 (the setting state of a route used for communication between mobile terminals MT) and location information on the mobile terminals MT#10 to #23.

Generally, as the hop count in communication between certain mobile terminals MT increases, throughput decreases. Therefore, the topology optimizing unit 15 is configured to determine a way to change the topology, so as to reduce the hop count in communication between certain mobile terminals MT.

For example, when a small amount of movement of a relay mobile terminal MT located on a route used in communication between certain mobile terminals MT reduces the hop count in the communication between the certain mobile terminals, the topology optimizing unit 15 is configured to determine a way to change the topology in the ad hoc networks #1 and #2, so that the relay mobile terminal MT moves in a required direction or to a required location.

Figure 4B:
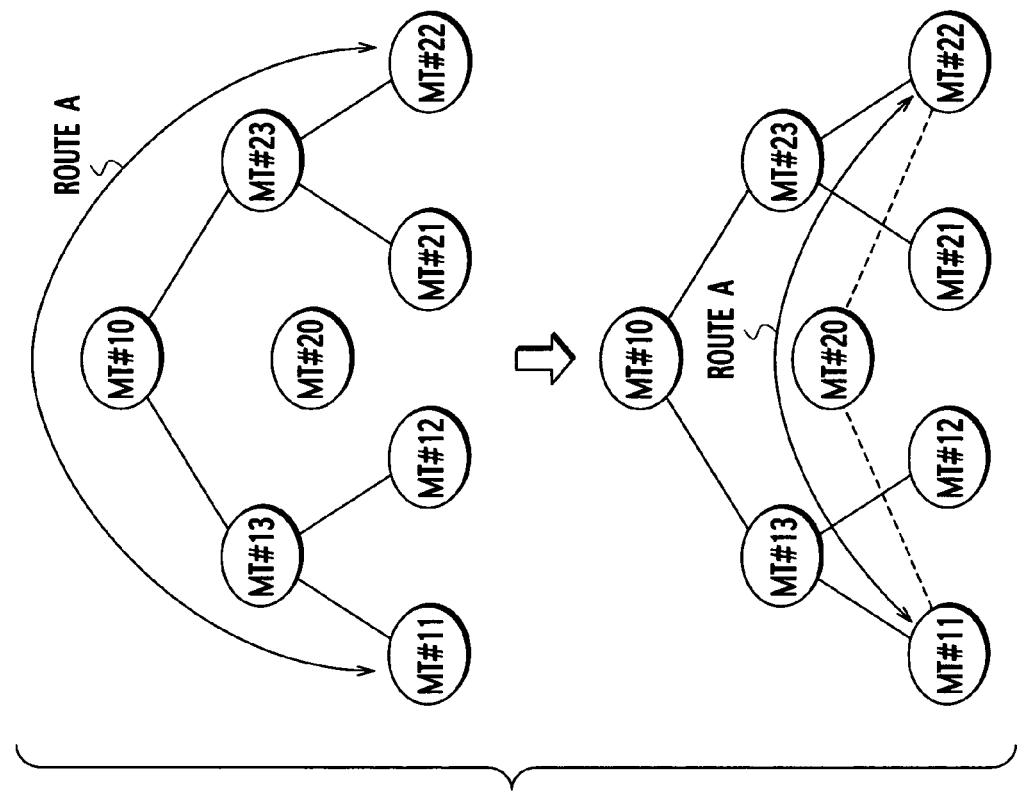
FIGS. 4A and 4B are diagrams showing how a topology optimizing unit of the assist controller apparatus in the mobile communication system according to the first embodiment of the present invention optimizes a topology in ad hoc networks.
Figure 4A:
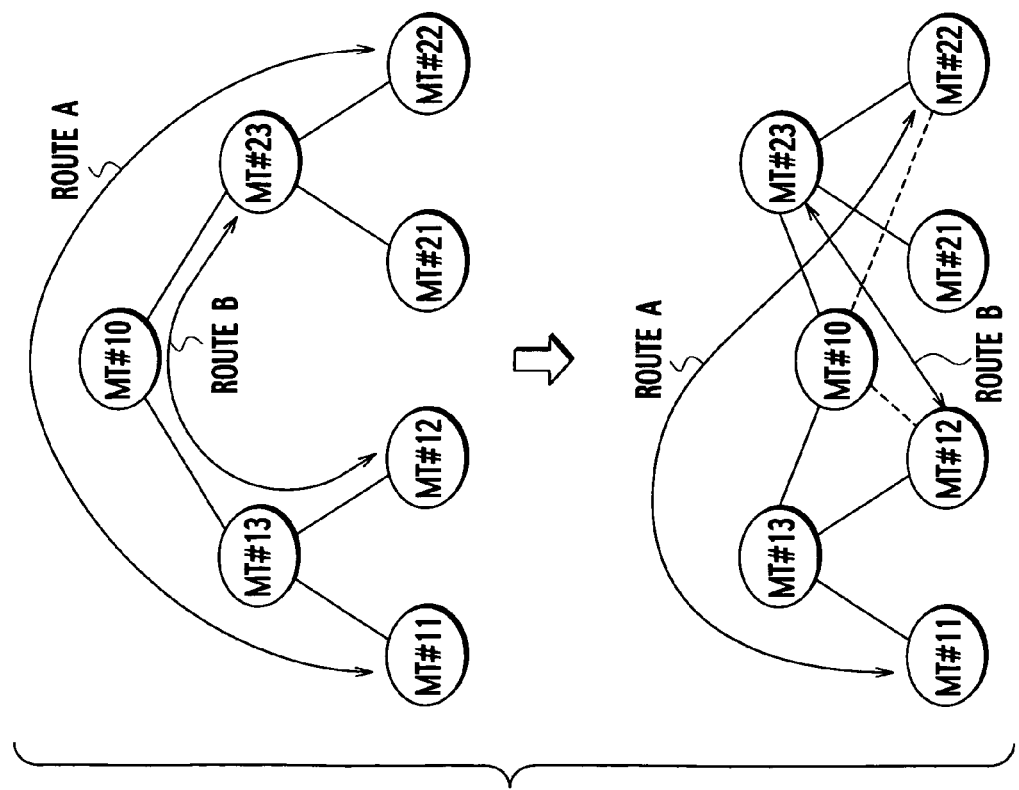

As shown in FIG. 4A, since a small amount of movement of the relay mobile terminal MT#10 located on a route A used for communication between the mobile terminals MT#11 and #22 reduces the hop count in the communication between the mobile terminals MT#11 and #22 from "4" to "3", the topology optimizing unit 15 determines a way to change the topology in the ad hoc networks #1 and #2, so that the relay mobile terminal MT#10 moves in a required direction or to a required location.

Also, as shown in FIG. 4A, since a small amount of movement of the relay mobile terminal MT#10 also located on a route B used for communication between the mobile terminals MT#12 and #23 reduces the hop count in the communication between the mobile terminals MT#12 and #23 from "3" to "2", the topology optimizing unit 15 determines a way to change the topology in the ad hoc networks #1 and #2, so that the relay mobile terminal MT#10 moves in a required direction or to a required location.

When joining of a mobile terminal not joining in the ad hoc networks #1 and #2 in the ad hoc networks #1 and #2 to be a relay mobile terminal MT in a route used for communication between certain mobile terminals MT reduces the hop count in the communication between the certain mobile terminals MT, the topology optimizing unit 15 is configured to determine a way to change the topology in the ad hoc networks #1 and #2, so that the mobile terminal MT joins in the ad hoc networks #1 and #2 to be a relay mobile terminal.

As shown in FIG. 4B, for example, since joining of the mobile terminal MT#20 not joining in the ad hoc networks #1 and #2 in the ad hoc networks #1 and #2 to be a relay mobile terminal #20 in the route A used for communication between the mobile terminals MT#11 and #22 reduces the hop count in the communication between the mobile terminals MT#11 and #22 from "4" to "2", the topology optimizing unit 15 determines a way to change the topology in the ad hoc networks #1 and #2, so that the mobile terminal MT#20 joins in the ad hoc networks #1 and #2 to be a relay mobile terminal MT#20.

The topology optimizing unit 15 may be configured to determine a way to change the topology in the ad hoc networks #1 and #2, based on traffic conditions in the ad hoc networks #1 and #2 monitored by the traffic condition monitoring unit 13.

For example, when the congestion state at a certain relay mobile terminal or in a certain link reduces overall throughput in the ad hoc networks #1 and #2, the topology optimizing unit 15 may be configured to determine a way to change the topology in the ad hoc networks #1 and #2, so that the traffic load is distributed.

Also, the topology optimizing unit 15 may be configured to determine a way to change the topology in the ad hoc networks #1 and #2 for a certain mobile terminal MT, so as to change a link setting destination without moving.

The instruction information transmitting unit 16 is configured to generate instruction information for changing a topology in the ad hoc networks #1 and #2, based on a way to change the topology determined by the topology optimizing unit 15, and to transmit the instruction information to a certain mobile terminal MT.

For example, the instruction information transmitting unit 16 may be configured to generate and transmit instruction information for instructing a relay mobile terminal MT located on a route used for communication between certain mobile terminals MT to move in a required direction or to a required location.

The required direction may be a direction shown based on four cardinal points or a direction specified by a building or the like as a landmark.

The required location may be an absolute location shown by latitude and longitude (such as GPS information, base station information or AP information) or a relative location specified based on a building or the like as a landmark.

The instruction information transmitting unit 16 may be also configured to generate and transmit instruction information for instructing a certain mobile terminal not joining in the ad hoc networks #1 and #2 to join in the ad hoc networks #1 and #2.

Also, the instruction information transmitting unit 16 may be configured to generate and transmit instruction information for instructing a certain mobile terminal MT to change a link setting destination (route) without moving.

A mobile terminal MT according to this embodiment is configured to be able to join in the ad hoc networks #1 and #2, and is also configured to be able to connect to the assist controller apparatus 10 in the assist network.

The mobile terminals MT#10 to #23 have basically the same configuration, and hereinafter, the configuration of the mobile terminal MT#10 will be representatively described.

Figure 5:
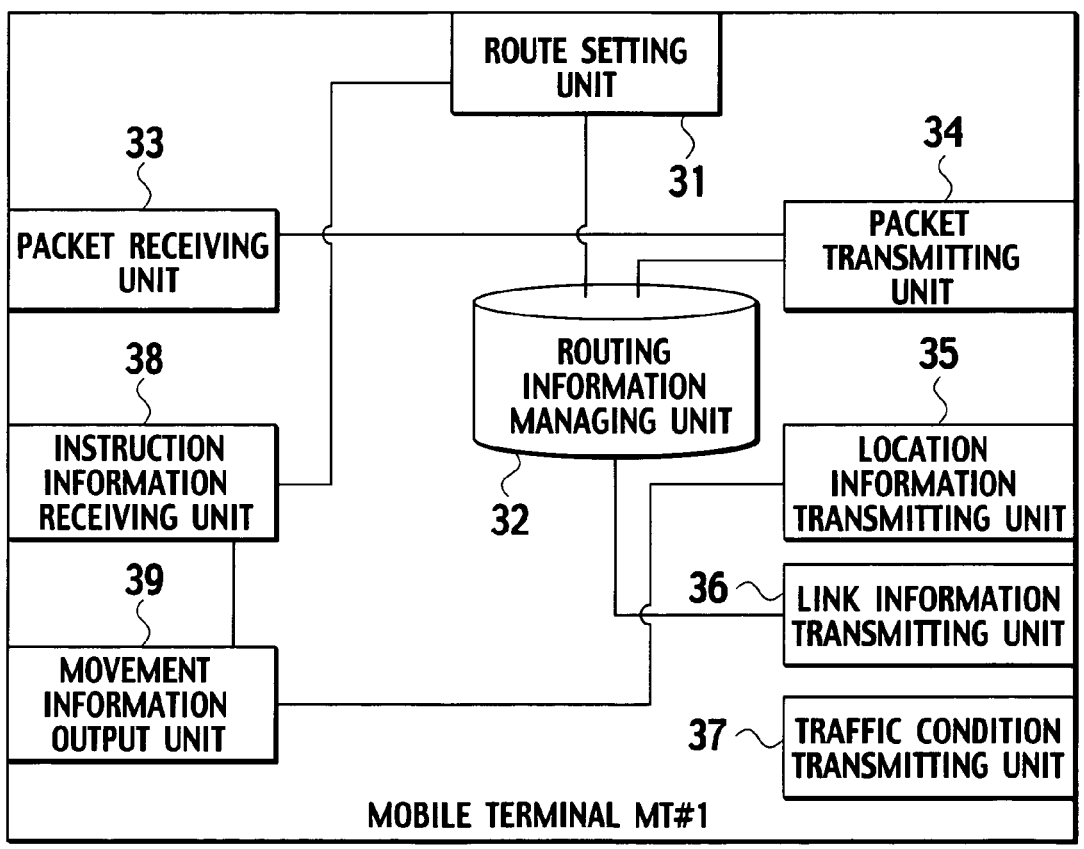
FIG. 5 is a functional block diagram of a mobile terminal in the mobile communication system according to the first embodiment of the present invention.

As shown in FIG. 5, the mobile terminal MT#10 of this embodiment includes a route setting unit 31, a routing information managing unit 32, a packet receiving unit 33, a packet transmitting unit 34, a location information transmitting unit 35, a link information transmitting unit 36, a traffic condition transmitting unit 37, an instruction information receiving unit 38, and a movement information output unit 39.

The route setting unit 31 is configured to set a route for use in communication with other mobile terminals MT#11 to #23 in a desired manner.

For example, the route setting unit 31 may be configured to set the route in advance, based on GPS information, base station information, access point information, or the like.

The route setting unit 31 may be configured to set a link (route) for newly joining in an ad hoc network or may be configured to change a link setting destination (route), in accordance with a communication (to be described below) from the instruction information receiving unit 38.

The routing information managing unit 32 is configured to manage routing information on a route set by the route setting unit 31.

The packet receiving unit 33 is configured to receive a packet transmitted from a forwarding source mobile terminal.

The packet transmitting unit 34 is configured to transmit a packet received by the packet receiving unit 33 to a forwarding destination mobile terminal, based on routing information managed by the routing information managing unit 32.

The location information transmitting unit 35 is configured to transmit location information on the mobile terminal MT#10 to the assist controller apparatus 10.

The location information transmitting unit 35 may be configured to transmit location information on the mobile terminal MT#10 at predetermined periods, or may be configured to transmit location information on the mobile terminal MT#10 when a certain trigger occurs.

The link information transmitting unit 36 is configured to transmit link information at the mobile terminal MT#10 to the assist controller apparatus 10.

The link information transmitting unit 36 may be configured to transmit link information at the mobile terminal MT#10 at predetermined periods, or may be configured to transmit link information at the mobile terminal #10 when a certain trigger occurs.

The traffic condition transmitting unit 37 is configured to transmit, to the assist controller apparatus 10, traffic conditions (such as the traffic volume or the congestion state) at the mobile terminal MT#10, and traffic conditions (such as the traffic volume or the congestion state) in a link established by the mobile terminal MT#10.

The traffic condition transmitting unit 37 may be configured to transmit the traffic conditions at predetermined periods, or may be configured to transmit the traffic conditions at the request of the assist controller apparatus 10.

The instruction information receiving unit 38 is configured to receive the above-described instruction information transmitted from the assist controller apparatus 10.

When the instruction information instructs the mobile terminal MT#10 to move in a required direction or to a required location, the instruction information receiving unit 38 is configured to communicate that to the movement information output unit 39.

When the instruction information instructs the mobile terminal MT#10 to join in the ad hoc networks #1 and #2, or instructs the mobile terminal MT#10 to change a link setting destination (route), the instruction information receiving unit 38 is configured to communicate that to the route setting unit 31.

The movement information output unit 39 is configured to provide an output based on instruction information from the assist controller apparatus 10, in response to a communication from the instruction information receiving unit 39.

For example, the movement information output unit 39 is configured to output a required direction or required location in or to which the mobile terminal MT#10 is supposed to move.

Here, the movement information output unit 39 may be configured to output the required direction or the required location by voice, or to display the required direction or the required location on the screen.

The movement information output unit 39 may be configured to output a direction such as "southwest" as the required direction, or may be configured to output an absolute location such as "xx north latitude, yy east longitude" as the required location, for example.

Also, the movement information output unit 39 may be configured to output a required direction and a moving distance together like "100 m northwest", or may be configured to output a direction specified by a building or the like as a landmark like "toward a building with a green sign".

Figure 6:
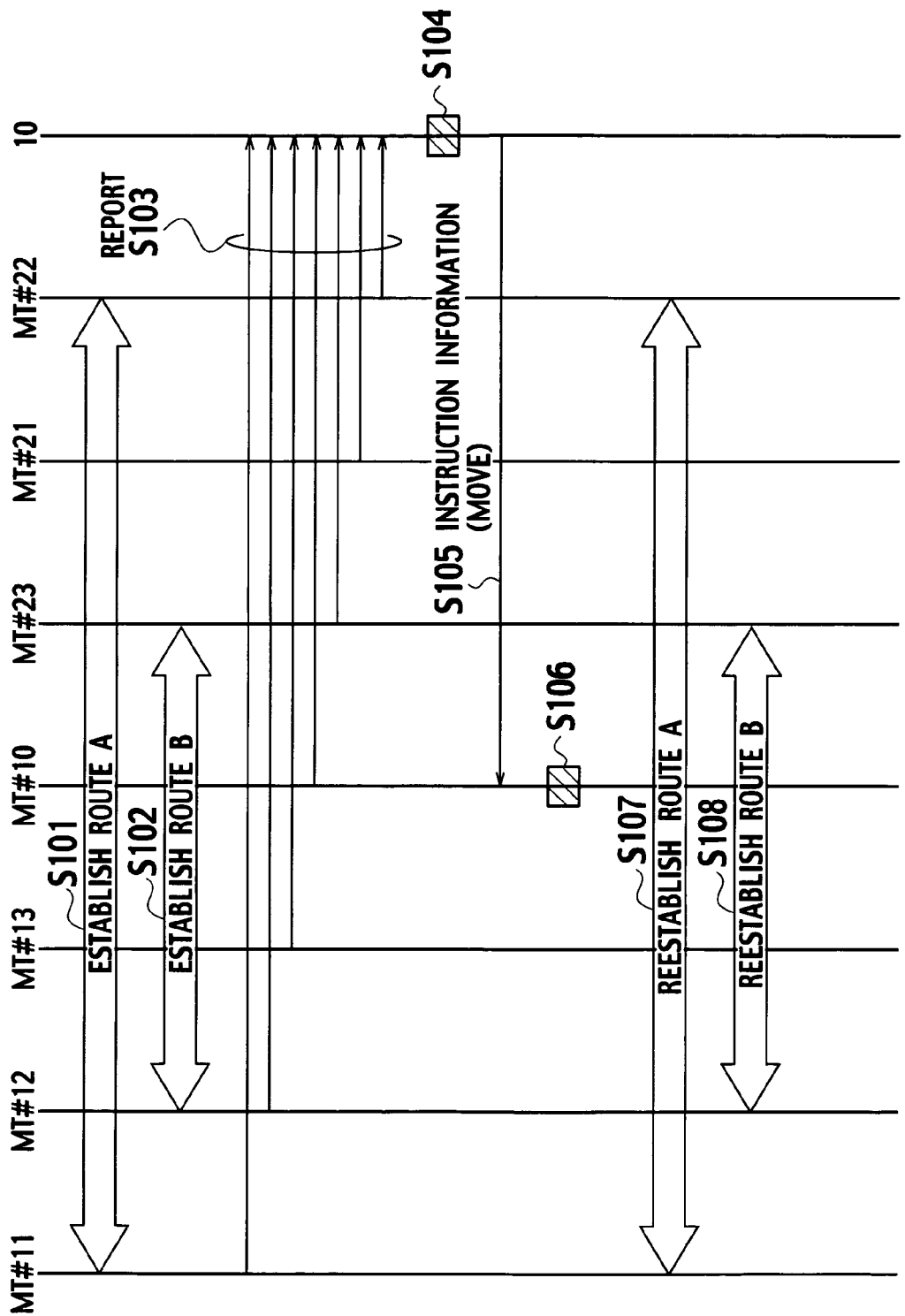
FIG. 6 is a sequence diagram showing an example of operation of the mobile communication system according to the first embodiment of the present invention.
Figure 7:
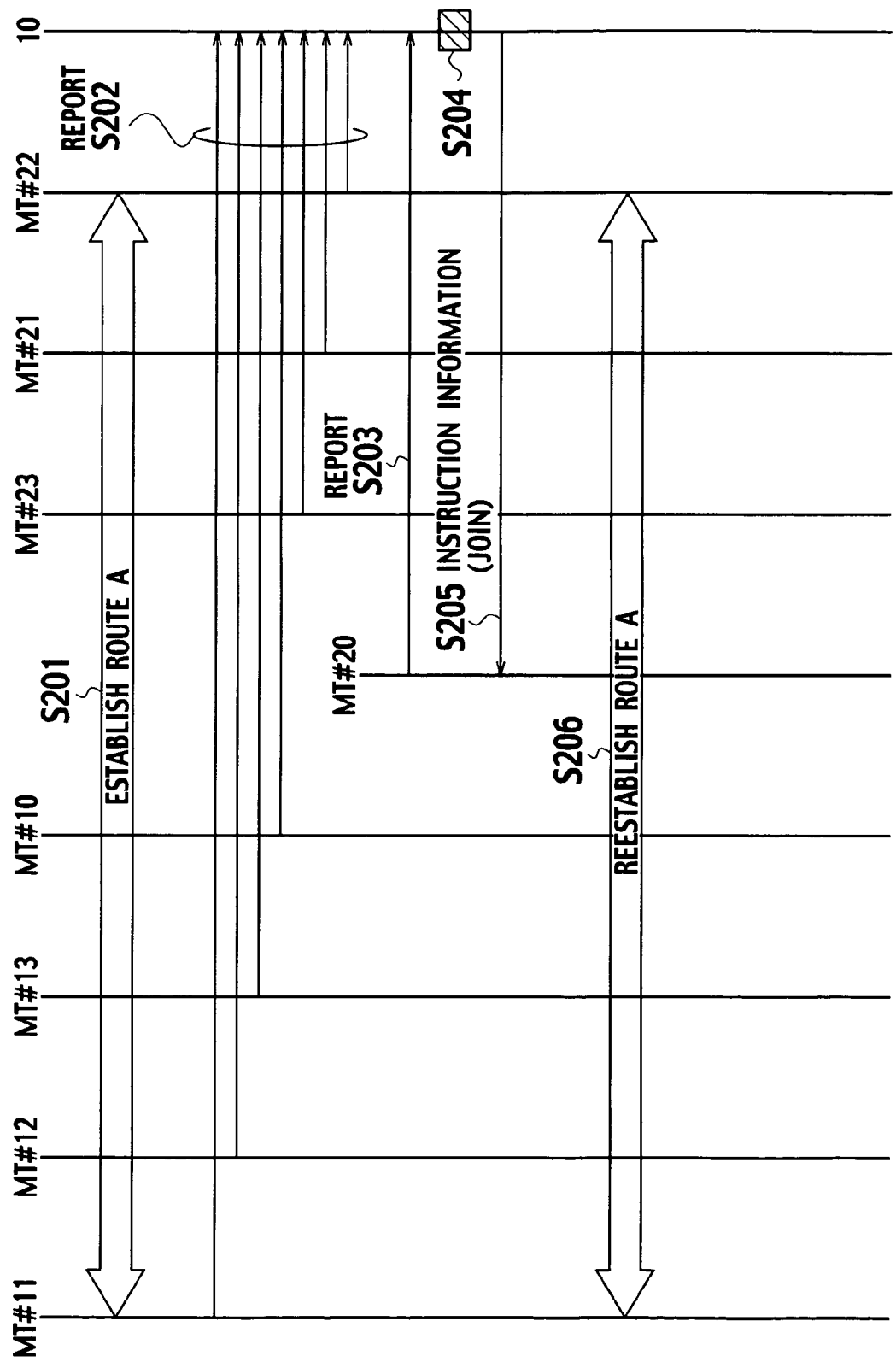
FIG. 7 is a sequence diagram showing an example of operation of the mobile communication system according to the first embodiment of the present invention.

Operation of the Mobile Communication System in the First Embodiment of the Invention With reference to FIGS. 6 and 7, the operation of the mobile communication system according to the first embodiment of the present invention will be described.

First, with reference to FIG. 6, an example of operation in the mobile communication system of this embodiment will be described, in which a certain mobile terminal is moved so as to optimize a topology in the ad hoc networks #1 and #2 (see FIG. 4A).

In step S101, the route A used in communication between the mobile terminal MT#11 and the mobile terminal MT#22 is established through the mobile terminals MT#13, #10 and #23 in a desired manner (see FIG. 4A).

In step S102, the route B used in communication between the mobile terminal MT#12 and the mobile terminal MT#23 is established through the mobile terminals MT#13 and #10 in a desired manner (see FIG. 4A).

In step S103, the mobile terminals MT#11, #12, #13, #10, #23, #21 and #22 report location information on the mobile terminals and link information at the mobile terminals to the assist controller apparatus 10.

In step S104, the assist controller apparatus 10 determines a way to change the topology in the ad hoc networks #1 and #2, based on the received location information on the mobile terminals and link information at the mobile terminals.

In the example of FIG. 4A, the assist controller apparatus 10 determines a way to change the topology in the ad hoc networks #1 and #2, so that the mobile terminal MT#10 moves in a required direction or to a required location.

In step S105, the assist controller apparatus 10 transmits, to the mobile terminal MT#10, instruction information generated based on the way to change the topology determined as described above, that is, instruction information for instructing the mobile terminal MT#10 to move in the required direction or to the required location.

In step S106, the mobile terminal MT#10 outputs the required direction or the required location in or to which to move, based on the received instruction information, and a user of the mobile terminal MT#10 moves in the output required direction or to the output required location with the mobile terminal MT#10.

In step S107, after the mobile terminal MT#10 has moved in the required direction or to the required location, the route A used in communication between the mobile terminal MT#11 and the mobile terminal MT#22 is reestablished through the mobile terminals MT#13 and #10 in a desired manner (see FIG. 4A).

In step S108, the route B used in communication between the mobile terminal MT#12 and the mobile terminal MT#23 is reestablished through the mobile terminal MT#10 in a desired manner (see FIG. 4A).

Second, with reference to FIG. 7, an example of operation in the mobile communication system of this embodiment will be described, in which a certain mobile terminal is made to join in the ad hoc networks #1 and #2 to be a relay mobile terminal, and thereby to optimize the topology in the ad hoc networks #1 and #2 (see FIG. 4B).

In step S201, the route A used in communication between the mobile terminal MT#11 and the mobile terminal MT#22 is established through the mobile terminals MT#13, #10 and #23 in a desired manner (see FIG. 4B).

In step S202, the mobile terminals MT#11, #12, #13, #10, #23, #21 and #22 report location information on the mobile terminals and link information at the mobile terminals to the assist controller apparatus 10.

In step S203, the mobile terminal MT#20 not joining in the ad hoc networks #1 and #2 also reports location information on the mobile terminal MT#20 to the assist controller apparatus 10.

In step S204, the assist controller apparatus 10 determines a way to change the topology in the ad hoc networks #1 and #2, based on the received location information on the mobile terminals and link information at the mobile terminals.

In the example of FIG. 4B, the assist controller apparatus 10 determines a way to change the topology in the ad hoc networks #1 and #2, so that the mobile terminal MT#20 joins in the ad hoc networks #1 and #2 to establish links with the mobile terminals MT#11 and #22.

In step S205, the assist controller apparatus 10 transmits, to the mobile terminal MT#20, instruction information generated based on the way to change the topology determined as described above, that is, instruction information for instructing the mobile terminal MT#20 to join in the ad hoc networks #1 and #2 and to establish links with the mobile terminals MT#11 and #22.

In step S206, after the mobile terminal MT#20 has joined in the ad hoc networks #1 and #2 and established links with the mobile terminals MT#11 and #22, the route A used in communication between the mobile terminal MT#11 and the mobile terminal MT#22 is reestablished through the mobile terminal MT#20 in a desired manner (see FIG. 4B).

Effects of the Mobile Communication System in the First Embodiment of the Invention According to the mobile communication system of this embodiment, a topology in the ad hoc networks #1 and #2 can be flexibly changed, based on location information and link information on and at the mobile terminals MT#10 to #23 forming the ad hoc networks #1 and #2.

According to the mobile communication system of this embodiment, when a small amount of movement of the relay mobile terminal MT#10 located on the route A used for communication between the mobile terminals MT#11 and #22 reduces the hop count in the communication between the mobile terminals MT#11 and #22, instruction information for instructing the relay mobile terminal MT#10 to move in a required direction or to a required location is transmitted to the relay mobile terminal MT#10, whereby the topology in the ad hoc networks #1 and #2 can be flexibly changed.

According to the mobile communication system of this embodiment, when joining of the mobile terminal MT#20 not joining in the ad hoc networks #1 and #2 in the ad hoc networks #1 and #2 to be a relay mobile terminal MT#20 in the route A used for communication between the mobile terminals MT#11 and #22 reduces the hop count in the communication between the mobile terminals MT#11 and #22, instruction information for instructing the mobile terminal MT#20 to join in the ad hoc networks #1 and #2 is transmitted to the mobile terminal MT#20, whereby the topology in the ad hoc networks #1 and #2 can be flexibly changed.

According to the mobile communication system of this embodiment, when the congestion state at a certain relay mobile terminal MT or in a certain link reduces overall throughput in the ad hoc networks #1 and #2, the topology in the ad hoc networks #1 and #2 can be flexibly changed to avoid the situation.

According to the mobile communication system of this embodiment, a topology in the ad hoc networks #1 and #2 can be changed so as to reduce the hop count in communication between mobile terminals MT, and thereby to improve throughput in the ad hoc networks #1 and #2.

Second Embodiment of the Invention

Figure 8:
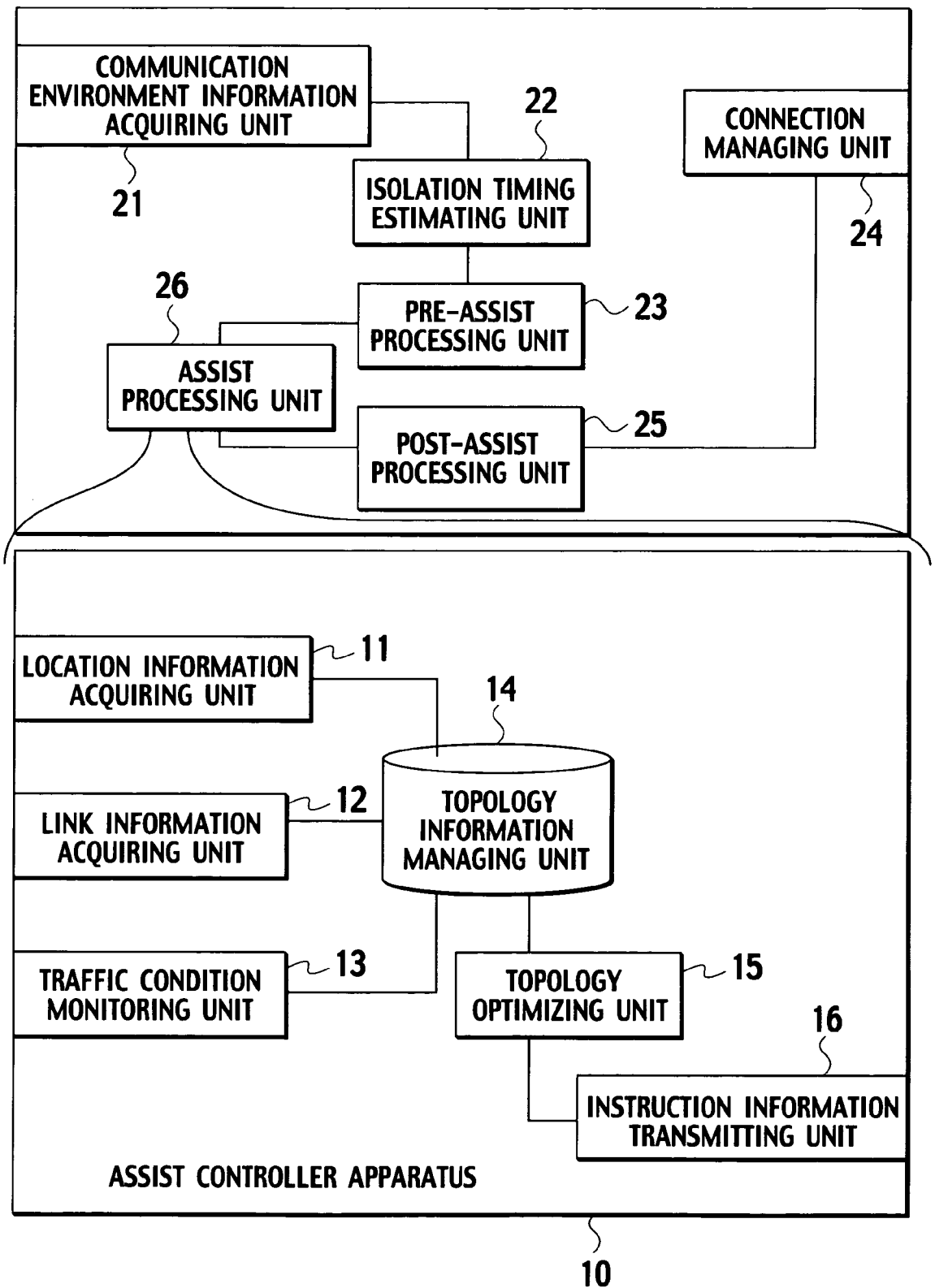
FIG. 8 is a functional block diagram of an assist controller apparatus in the mobile communication system according to the second embodiment of the present invention.
Figure 9:
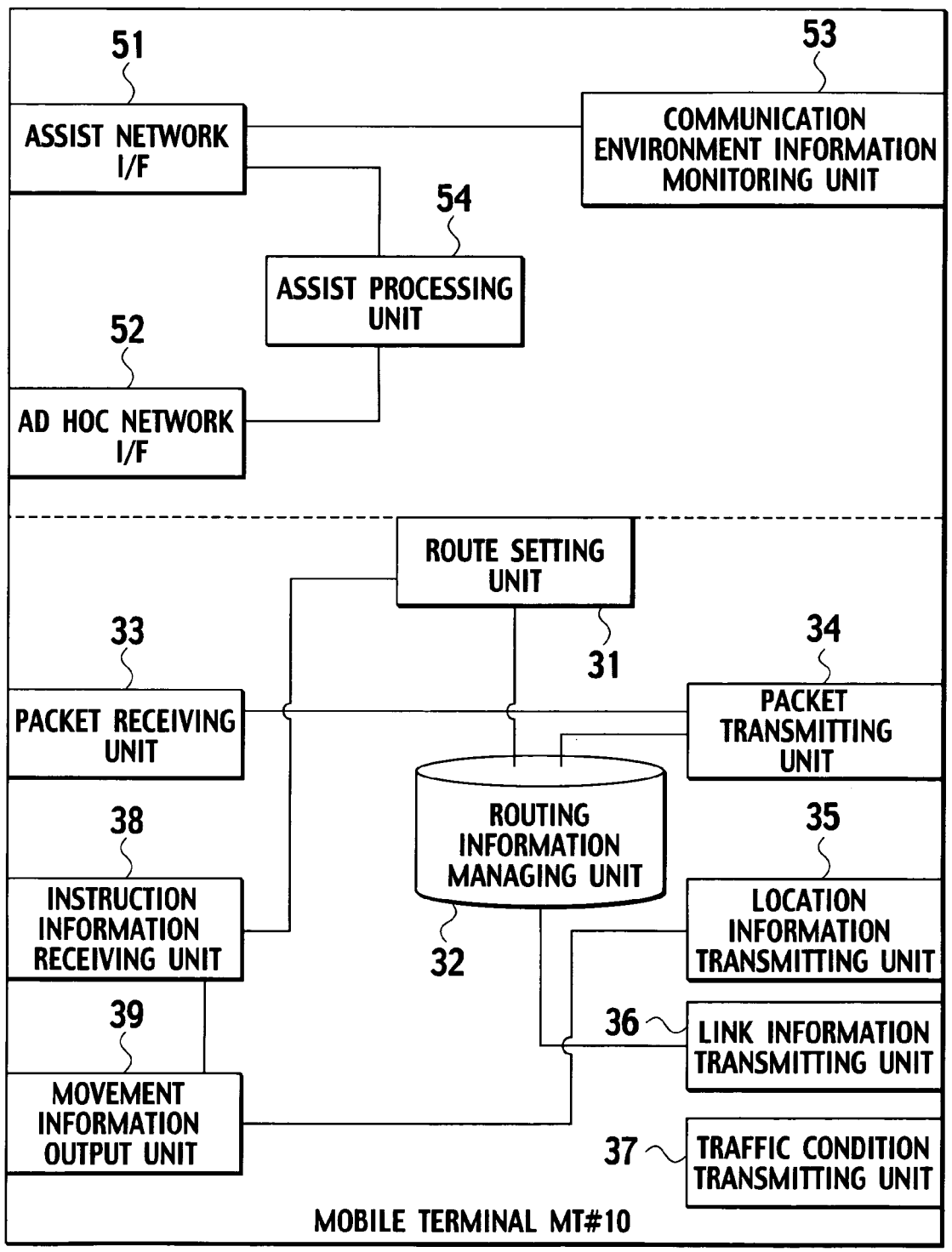
FIG. 9 is a functional block diagram of a mobile terminal in the mobile-communication system according to the second embodiment of the present invention.
Figure 10:
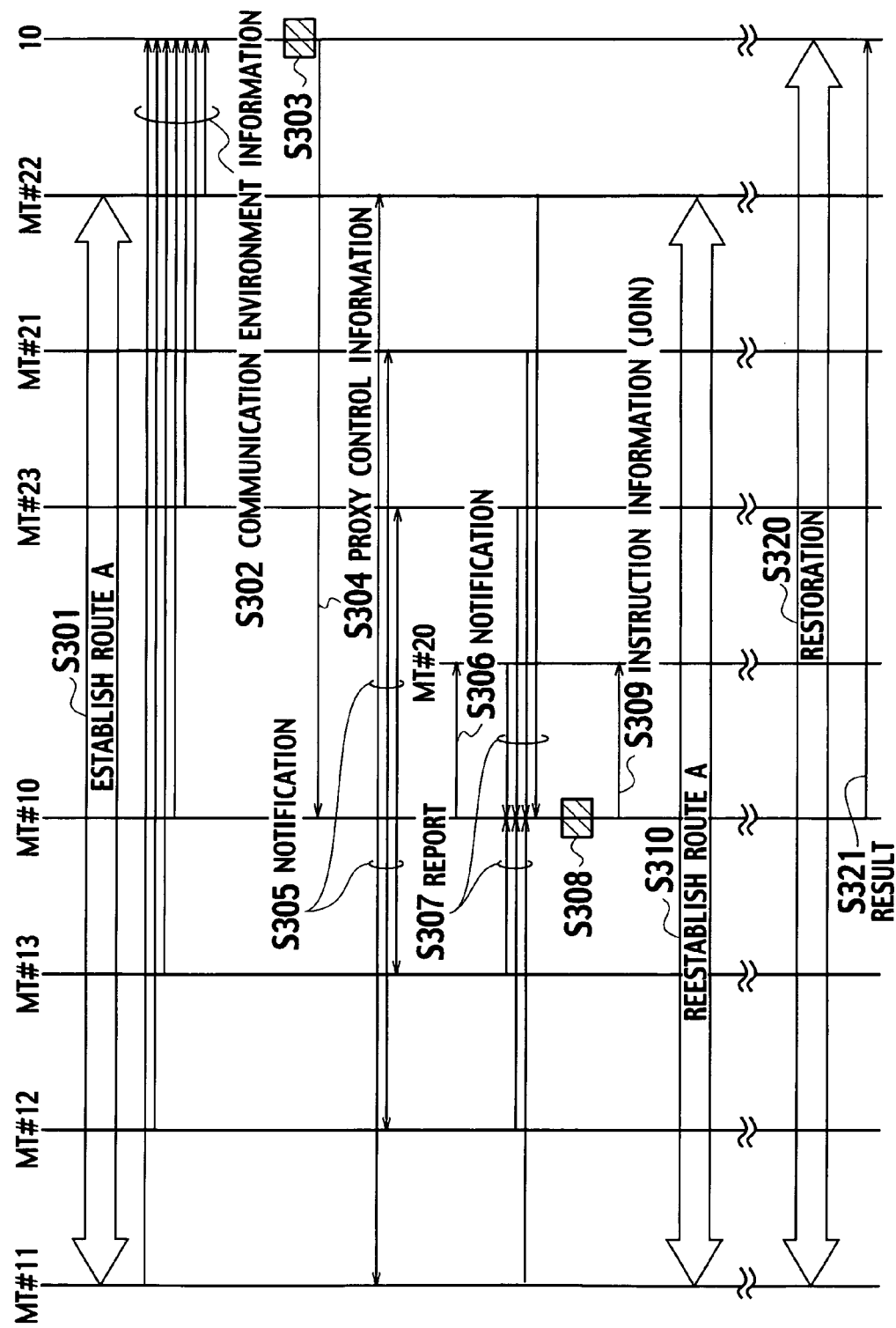
FIG. 10 is a sequence diagram showing an example of operation of the mobile communication system according to the second embodiment of the present invention.

With reference to FIGS. 8 to 10, a mobile communication system according to a second embodiment of the present invention will be described.

Hereinafter, differences of the mobile communication system in the second embodiment of the present invention from the mobile communication system of the above-described first embodiment will be mainly described.

In this embodiment, the configuration of a representative mobile terminal MT (e.g., mobile terminal #10), among mobile terminals MT#10 to #23 belonging to ad hoc networks #1 and #2, which can perform topology control in the ad hoc networks #1 and #2 in place of an assist controller apparatus 10, in a situation where connections between the mobile terminals MT#10 to #23 and the assist network 10 are cut, will be described.

As shown in FIG. 8, the assist controller apparatus 10 according to this embodiment includes a communication environment information acquiring unit 21, an isolation timing estimating unit 22, a pre-assist processing unit 23, a connection managing unit 24, a post-assist processing unit 25, and an assist processing unit 26.

The communication environment information acquiring unit 21 is configured to acquire, from the mobile terminals MT#10 to MT#23 belonging to the ad hoc networks #1 and #2, communication environment information showing communication environments at the mobile terminals MT#10 to MT#23.

The communication environment information acquiring unit 21 is configured to acquire radio wave conditions at the mobile terminals MT#10 to #23 as communication environment information.

The radio wave conditions may be reception power, reception SIR or reception CIR at the mobile terminals MT#10 to MT#23.

The communication environment information acquiring unit 21 may be configured to acquire information other than radio wave conditions as communication environment information if the information shows communication environments at the mobile terminals MT#10 to MT#23.

The communication environment information acquiring unit 21 may be configured to wait transmission of communication environment information from the mobile terminals MT#10 to MT#23 for acquisition, or may be configured to transmit a communication environment information acquisition request to the mobile terminals MT#10 to MT#23 at predetermined timings so as to acquire communication environment information.

The isolation timing estimating unit 22 is configured to determine whether acquired communication environment information satisfies a predetermined condition or not.

Specifically, when acquired communication environment information satisfies the predetermined condition, the isolation timing estimating unit 22 is configured to estimate that the connections between the assist controller apparatus 10 and the mobile terminals MT#10 to #23 will be cut soon (that is, the ad hoc networks #1 and #2 formed by the mobile terminals MT#10 to MT#23 will be isolated soon).

For example, when the average of the reception power, the reception SIR or the reception CIR at the mobile terminals MT#10 to MT#23 is less than or equal to a predetermined threshold, the isolation timing estimating unit 22 is configured to determine that acquired communication environment information satisfies the predetermined condition.

Alternatively, the isolation timing estimating unit 22 may be configured to prepare several predetermined conditions, and to estimate the timing of isolation of the ad hoc networks #1 and #2 formed by the mobile terminals MT#10 to MT#23 based on a predetermined condition which acquired communication environment information satisfies.

For example, when the average of the reception power, the reception SIR or the reception CIR at the mobile terminals MT#10 to MT#23 is less than or equal to a first threshold, the isolation timing estimating unit 22 is configured to estimate that the connections between the assist controller apparatus 10 and the mobile terminals MT#10 to #23 will be cut in ten seconds (that is, the isolation timing is in ten seconds).

When the average of the reception power, the reception SIR or the reception CIR at the mobile terminals MT#10 to #23 is less than or equal to a second threshold (first threshold>second threshold), the isolation timing estimating unit 22 is configured to estimate that the connections between the assist controller apparatus 10 and the mobile terminals MT#10 to #23 will be cut in one second (that is, the isolation timing is in one second).

The pre-assist processing unit 23 is configured to instruct a representative mobile terminal (e.g., mobile terminal MT#10) belonging to the ad hoc networks #1 and #2 to control a topology in the ad hoc networks #1 and #2 in place of the assist processing unit 26 of the assist controller apparatus 10, based on a result of determination by the isolation timing estimating unit 22.

Specifically, the pre-assist processing unit 23 is configured to transmit proxy control information for controlling the topology in the ad hoc networks #1 and #2 in place of the assist processing unit 26 of the assist controller apparatus 10, to the representative mobile terminal MT#10 belonging to the ad hoc networks #1 and #2.

The proxy control information includes, for example, an estimation that the connections between the assist controller apparatus 10 and the mobile terminals MT#10 to MT#23 will be cut soon (that is, the ad hoc networks #1 and #2 formed by the mobile terminals MT#10 to #23 will be isolated soon), an isolation timing, and a program and data (such as topology information) required for controlling the topology in the ad hoc networks #1 and #2.

The pre-assist processing unit 23 may be configured to control the timing of transmission of the proxy control information, based on an isolation timing estimated by the isolation timing estimating unit 22.

The pre-assist processing unit 23 may be alternatively configured to transmit the proxy control information to a plurality of representative mobile terminals instead of transmitting the proxy control information to the one representative mobile terminal MT#10, thereby instructing them to perform topology control in the ad hoc networks #1 and #2 in place of the assist processing unit 26 of the assist controller apparatus 10.

The connection managing unit 24 is configured to manage the connections between the mobile terminals MT#10 to MT#23 forming the ad hoc networks #1 and #2 and the assist controller apparatus 10.

When the connection managing unit 24 detects restoration of the connections, it is configured to communicate that to the post-assist processing unit 25.

The post-assist processing unit 25 is configured to perform post-processing on topology control which the representative mobile terminal MT#10 has performed in place of the assist processing unit 26 of the assist controller apparatus 10, when the connections between the mobile terminals MT#10 to MT#23 belonging to the ad hoc networks #1 and #2 and the assist controller apparatus 10 are restored.

Specifically, the post-assist processing unit 25 is configured to receive a result of topology control performed by the representative mobile terminal MT#10 in place of the assist processing unit 26 of the assist controller apparatus 10, when the connections between the mobile terminals MT#10 to MT#23 belonging to the ad hoc networks #1 and #2 and the assist controller apparatus 10 are restored.

Then, the post-assist processing unit 25 is configured to perform processing, based on the received control result, for the assist processing unit 26 to resume topology control in the ad hoc networks #1 and #2.

For example, the post-assist processing unit 25 is configured to inherit topology information on the ad hoc networks #1 and #2 as a control result from the representative mobile terminal MT#10.

The assist processing unit 26 is configured to control a topology in the ad hoc networks #1 and #2.

That is, the assist processing unit 26 is configured to implement the functions of a location information acquiring unit 11, a link information acquiring unit 12, a traffic condition monitoring unit 13, a topology information managing unit 14, a topology optimizing unit 15, and an instruction information transmitting unit 16 (see FIG. 2).

As shown in FIG. 9, the mobile terminal MT#10 of this embodiment includes, in addition to the components shown in FIG. 2, an assist network interface (I/F) 51, an ad hoc network interface (I/F) 52, a communication environment information monitoring unit 53, and an assist processing unit 54.

The assist network interface 51 is configured to serve as an interface with an assist network.

For example, the assist network interface 51 is configured to transmit, to the assist controller apparatus 10, at predetermined timings, communication environment information showing a communication environment at the mobile terminal MT#10 generated by the communication environment information monitoring unit 53.

The assist network interface 51 is also configured to receive proxy control information from the assist controller apparatus 10, and to forward the received proxy control information to the assist processing unit 54.

The assist network interface 51 is also configured to manage the connection between the mobile terminal MT#10 and the assist controller apparatus 10, and when the connection is cut or when it determines that the connection will be cut soon, to communicate that to the assist processing unit 54.

The ad hoc network interface 52 is configured to serve as an interface with the ad hoc networks #1 and #2.

The ad hoc network interface 52 is configured to perform direct communication with the other mobile terminals MT#11 to #23 belonging to the ad hoc networks #1 and #2, thereby transmitting and receiving certain information.

During a period in which the assist processing unit 54 controls a topology in the ad hoc networks #1 and #2 in place of the assist processing unit 26 of the assist controller apparatus 10, for example, the ad hoc network interface 52 is configured to acquire location information and link information from the other mobile terminals MT#11 to #23 belonging to the ad hoc networks #1 and #2, and to transmit the above-described instruction information.

The communication environment information monitoring unit 53 is configured to monitor a communication environment at the mobile terminal MT#10, thereby to generate communication environment information.

For example, the communication environment information monitoring unit 53 is configured to generate communication environment information showing radio wave conditions at the mobile terminal MT#10 (such as the reception power, the reception SIR or the reception CIR at the mobile terminal MT#10).

The communication environment information monitoring unit 53 may be alternatively configured to generate communication environment information including information other than radio wave conditions if the information shows a communication environment at the mobile terminal MT#10.

The assist processing unit 54 is configured to control the topology of the other mobile terminals MT#11 to #23 belonging to the ad hoc networks #1 and #2, in place of the assist processing unit 26 of the assist controller apparatus 10, based on proxy control information received through the assist network interface 51, when the connection between the mobile terminal MT#10 and the assist controller apparatus 10 is cut, at the latest.

That is, in that case, the assist processing unit 54 is configured to implement the functions of the location information acquiring unit 11, the link information acquiring unit 12, the traffic condition monitoring unit 13, the topology information managing unit 14, the topology optimizing unit 15, and the instruction information transmitting unit 16 (see FIG. 2).

The assist processing unit 54 only needs to be configured to perform the above-described topology control when the connection is cut, at the latest, and may be configured to perform the topology control after a lapse of a predetermined period since reception of the proxy control information.

Also, when the connection between the mobile terminal MT#10 and the assist controller apparatus 10 is restored, the assist processing unit 54 is configured to transmit a result of the topology control (such as topology information) it has performed in place of the assist processing unit 26 of the assist controller apparatus 10, to the assist controller apparatus 10 through the assist network interface 51.

With reference to FIG. 10, an example of operation in the mobile communication system according to this embodiment will be described, in which a topology in the ad hoc networks #1 and #2 is changed from the state of being controlled by the assist controller apparatus 10 to the state of being autonomously controlled by the representative mobile terminal #10.

As shown in FIG. 10, in step S301, a route A used in communication between the mobile terminal MT#11 and the mobile terminal MT#22 is established through the mobile terminals MT#13, #10 and #23 in a desired manner (see FIG. 4B).

In step S302, the connections between the assist controller apparatus 10 and the mobile terminals MT#10, #11, #12, #13, #21, #22 and #23 are established.

The mobile terminals MT#10, #11, #12, #13, #21, #22 and #23 transmit communication environment information to the assist controller apparatus 10 at a predetermined timing.

In step S303, since the communication environment information satisfies a predetermined condition, the isolation timing estimating unit 22 of the assist controller apparatus 10 estimates that the connections between the assist controller apparatus 10 and the mobile terminals MT#10, #11, #12, #13, #21, #22 and #23 forming the ad hoc networks #1 and #2 will be cut soon (that is, the ad hoc network #1 formed by the mobile terminals MT#10, #11, #12 and #13, and the ad hoc network #2 formed by the mobile terminals MT#10, #21, #22 and #23 will be isolated soon).

In step S304, the pre-assist processing unit 23 of the assist controller apparatus 10 transmits proxy control information to the representative mobile terminal MT#10.

In step S305, the representative mobile terminal MT#10 notifies the mobile terminals MT#11, #12, #13, #21, #22 and #23 within the ad hoc networks #1 and #2 that it controls the topology in the ad hoc networks #1 and #2 in place of the assist controller apparatus 10, based on the received proxy control information.

In step S306, the representative mobile terminal MT#10 notifies the mobile terminal MT#20 not joining in the ad hoc networks #1 and #2 that it controls the topology in the ad hoc networks #1 and #2 in place of the assist controller apparatus 10, based on the received proxy control information.

In step S307, the mobile terminals MT #11, #12, #13, #20, #23, #21 and #22 report location information on the mobile terminals and link information at the mobile terminals to the representative mobile terminal MT#10.

In step S308, the representative mobile terminal MT#10 determines a way to change the topology in the ad hoc networks #1 and #2, based on the received location information on the mobile terminals and link information at the mobile terminals.

In the example of FIG. 4B, the representative mobile terminal MT#10 determines a way to change the topology in the ad hoc networks #1 and #2, so that the mobile terminal MT#20 joins in the ad hoc networks #1 and #2 and establishes links with the mobile terminals MT#11 and #22.

In step S309, the representative mobile terminal MT#10 transmits, to the mobile terminal MT#20, instruction information generated based on the way to change the topology determined as described above, that is, instruction information for instructing the mobile terminal MT#20 to join in the ad hoc networks #1 and #2 and establish links with the mobile terminals MT#11 and #22.

In step S310, after the mobile terminal MT#20 has joined in the ad hoc networks #1 and #2 and established links with the mobile terminals MT#11 and MT#22, the route A used in communication between the mobile terminal #11 and the mobile terminal MT#22 is reestablished through the mobile terminal MT#20 in a desired manner (see FIG. 4B).

In step S320, when the connections between the mobile terminals MT#10, #11, #12, #13, #21, #22 and #23 and the assist controller apparatus 10 are restored, in step S321, the mobile terminal MT#10 detects that and transmits, to the assist controller apparatus 10, a result of the topology control (such as topology information) it has performed in place of the assist controller apparatus 10.

Thereafter, the post-assist processing unit 25 of the assist controller apparatus 10 inherits the control state (such as changed topology information) during a period of disconnection between the mobile terminals MT#10, #11, #12, #13, #21, #22 and #23 and the assist controller apparatus 10, based on the received control result, and then, the assist processing unit 26 of the assist controller apparatus 10 resumes topology control in the ad hoc networks #1 and #2.

According to the mobile communication system of the second embodiment of the present invention, even when the predetermined condition is satisfied (e.g., when radio wave conditions between the assist controller apparatus 10 and the mobile terminals MT#10, #11, #12, #13, #21, #22 and #23 deteriorate), the pre-assist processing unit 23 of the assist controller apparatus 10 transmits proxy control information to the representative mobile terminal MT#10, whereby the representative mobile terminal MT#10 can control a topology in the ad hoc networks #1 and #2 in place of the assist controller apparatus 10, using the proxy control information transmitted from the assist controller apparatus 10.

According to the mobile communication system of the second embodiment of the present invention, the assist controller apparatus 10 can quickly and easily resume topology control in the ad hoc networks #1 and #2, using a result of control (such as topology information) by the representative mobile terminal MT#10.

Therefore, according to the mobile communication system of the second embodiment of the present invention, even when communication between the assist controller apparatus 10 and the ad hoc networks #1 and #2 is disconnected and the ad hoc networks #1 and #2 are isolated, the representative mobile terminal MT#10 performs the functions of the assist controller apparatus 10, so that a topology in the ad hoc networks #1 and #2 can be flexibly changed as described above.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A controller apparatus configured to control a topology in an ad hoc network formed by a plurality of mobile terminals, the controller apparatus comprising:
    a topology information managing unit configured to manage topology information showing the topology;
    a location information acquiring unit configured to acquire location information indicating a physical location on the mobile terminals;
    a link information acquiring unit configured to acquire link information at the mobile terminals;
    a determining unit configured to determine a way to change the topology, based on the acquired location information, the acquired link information, and the topology information managed by the topology information managing unit;
    a transmitting unit configured to generate instruction information for changing the topology, based on the determined way to change the topology, for transmission to a certain mobile terminal, the instruction information configured to instruct the certain mobile terminal forming a part of the ad hoc network to move in a required direction or to a required location;
    a communication environment information acquiring unit configured to acquire, from the mobile terminals, communication environment information showing a communication environment at the mobile terminals; and
    a proxy control information transmitting unit configured to transmit proxy control information for performing the topology control in place of the controller apparatus, to a representative mobile terminal belonging to the ad hoc network, when the acquired communication environment information includes at least one of an average of a reception power, a reception signal-to-interference ratio (SIR) and a reception carrier-to-interference ratio (CIR) at the mobile terminals which is less than or equal to a predetermined threshold.

2. The controller apparatus as set forth in claim 1, wherein the instruction information is configured to instruct the certain mobile terminal not joining in the ad hoc network to join in the ad hoc network.

3. The controller apparatus as set forth in claim 1, wherein the determining unit is configured to determine a way to change the topology, based on traffic conditions in the ad hoc network.

4. The controller apparatus as set forth in claim 1, wherein the determining unit is configured to determine a way to change the topology, so as to reduce a hop count in communication between certain mobile terminals.

5. The controller apparatus as set forth in claim 1, wherein the topology information management unit is configured to associate and store a monitoring point and traffic volume.

6. The controller apparatus as set forth in claim 1, wherein the instruction information instructs the certain mobile terminal forming a part of the ad hoc network to move in a required physical direction or to a required physical location.

7. A mobile terminal configured to be able to join in an ad hoc network, comprising:
    a location information transmitting unit configured to transmit location information indicating a physical location on the mobile terminal to a controller apparatus configured to control a topology in the ad hoc network;
    a link information transmitting unit configured to transmit link information at the mobile terminal to the controller apparatus;
    an output unit configured to output instruction information transmitted from the controller apparatus, the instruction information configured to change the topology based on location information by instructing the mobile terminal to move in a required direction or to a required location;
    a communication environment information transmitting unit configured to transmit, to the controller apparatus, communication environment information showing a communication environment at the mobile terminal; and
    a proxy control information receiving unit configured to receive proxy control information, for performing the topology control in place of the controller apparatus, when the acquired communication environment information includes at least one of an average of a reception power, a reception signal-to-interference ratio (SIR) and a reception carrier-to-interference ratio (CIR) at the mobile terminal which is less than or equal to a predetermined threshold.

8. The mobile terminal as set forth in claim 7, wherein the instruction information is configured to instruct the mobile terminal to join in the ad hoc network.

9. The mobile terminal as set forth in claim 7, wherein the instruction information instructs the mobile terminal to move in a required physical direction or to a required physical location.

10. A communication control method in which a controller apparatus is configured to control a topology in an ad hoc network formed by a plurality of mobile terminals, the method comprising:
    acquiring, at the controller apparatus, location information indicating a physical location on the mobile terminals;
    acquiring, at the controller apparatus, link information at the mobile terminals;
    determining, at the controller apparatus, a way to change the topology, based on the acquired location information, the acquired link information, and topology information showing the topology managed by the controller apparatus;

generating, at the controller apparatus, instruction information for changing the topology, based on the determined way to change the topology, for transmission to a certain mobile terminal;

outputting, at the certain mobile terminal, the instruction information transmitted from the controller apparatus, and the instruction information configured to instruct the certain mobile terminal forming a part of the ad hoc network to move in a required direction or to a required location:

acquiring, at the controller apparatus from the mobile terminals, communication environment information showing a communication environment at the mobile terminals; and transmitting proxy control information for performing the topology control in place of the controller apparatus, to a representative mobile terminal belonging to the ad hoc network, when the acquired communication environment information includes at least one of an average of a reception power, a reception signal-to-interference ratio (SIR) and a reception carrier-to-interference ratio (CIR) at the mobile terminals which is less than or equal to a predetermined threshold.

11. The communication control method according to claim 10, wherein the instruction information instructs the certain mobile terminal forming a part of the ad hoc network to move in a required physical direction or to a required physical location.

* * * * *